(12) United States Patent
Noack et al.

(10) Patent No.: US 6,824,604 B1
(45) Date of Patent: Nov. 30, 2004

(54) COLORING PIGMENT GRANULATES AND METHOD FOR PRODUCING THE SAME

(75) Inventors: Bernd Noack, Saalfeld (DE); Bernd Herrmann, Schleiz (DE)

(73) Assignee: Rhein-Chemotechnik GmbH Gesellschaft für Chemisch-Technishche Erzeugnisse, Breitscheid (DE)

(*) Notice: Subject to any disclaimer, the term of this patent is extended or adjusted under 35 U.S.C. 154(b) by 485 days.

(21) Appl. No.: 10/030,925

(22) PCT Filed: Oct. 20, 2000

(86) PCT No.: PCT/DE00/03690

§ 371 (c)(1),
(2), (4) Date: Jan. 4, 2002

(87) PCT Pub. No.: WO01/28954

PCT Pub. Date: Apr. 26, 2001

(30) Foreign Application Priority Data

Oct. 21, 1999 (DE) .......................................... 199 50 712

(51) Int. Cl.[7] .......................... C04B 14/00; C04B 14/02
(52) U.S. Cl. ....................... 106/400; 106/499; 106/712; 428/403; 428/404; 428/405; 428/406; 428/407; 428/408
(58) Field of Search ................................ 106/400, 499, 106/712; 427/218; 428/403–407

(56) References Cited

U.S. PATENT DOCUMENTS

| | | |
|---|---|---|
| 5,002,609 A | 3/1991 | Rademachers et al. |
| 5,199,986 A * | 4/1993 | Krockert et al. ............ 106/712 |
| 5,215,583 A | 6/1993 | Linde et al. |
| 5,797,988 A | 8/1998 | Schmidt-Park et al. |

FOREIGN PATENT DOCUMENTS

| | | |
|---|---|---|
| DE | 39 18 694 | 6/1989 |
| DE | 41 03 531 | 8/1992 |
| DE | 196 38 042 | 10/1997 |
| DE | 197 31 698 | 1/1999 |
| EP | 0 191 278 | 9/1985 |

* cited by examiner

*Primary Examiner*—C. Melissa Koslow
*Assistant Examiner*—Shalie A. Manlove
(74) *Attorney, Agent, or Firm*—Collard & Roe, P.C.

(57) ABSTRACT

The invention relates to coloring pigment granulates and a method for producing the same. The aim of the invention is to provide a granulate and a method for economically producing the same. The granulate disintegrates very quickly once added to a building material that is to be colored. To this end, the granulates are comprised of granulate cores which do not contain binding agents, which have a granular size ranging from 0.1 to 8 mm and which are enclosed by an enveloping layer made of a material that can be broken down. In addition, the granulates have a moisture content <30% and the granulates that do not contain binding agents are produced in a pregranulator, are compacted immediately after granulation and are subsequently subjected to a screening process. Lastly, the useful granular fraction that has been separated out during the screening process is enclosed with an enveloping material. The invention relates to coloring pigment granulates for coloring building materials, especially for coloring concrete, and to a method for producing coloring pigment granulates.

3 Claims, 1 Drawing Sheet

COLORING PIGMENT GRANULATES AND METHOD FOR PRODUCING THE SAME

CROSS REFERENCE TO RELATED APPLICATIONS

Applicants claim priority under 35 U.S.C. §119 of German Application No. 199 50 712.0 filed Oct. 21, 1999. Applicants also claim priority under 35 U.S.C. §120 of PCT/DE00/03690 filed Oct. 20, 2000. The international application under PCT article 21(2) was not published in English.

The invention relates to colouring pigment granulated materials for the colouring of building material especially for the colouring of concrete, and to process to produce colouring pigment granulated materials.

Usually, colouring powders for concrete colours are granulated to obtain good dosing and transport properties, and to reduce the formation of dust. Different granulated materials for the colouring of concrete are known from Background Art, with the granulated materials being made from a largely homogeneous mixture of colouring powder and a binder to obtain a sufficient granulated material strength. The drawback of these disclosed granulated materials is the low dissolution speed caused by a largely homogeneous binder distribution. Until now, an increase in dissolution speed was obtained, e.g., by reducing granulated material size, while this led to an increased formation of dust during transportation and processing.

In addition, this requires the admixture of dispersing and surface-active agents to the granulated material.

DE 196 38 042 A1 describes a process to produce inorganic pressed or briquette granulated materials from inorganic pigments using auxiliaries, in which one or more pigments are mixed with one or more auxiliaries improving the working properties, this mix is subjected to a pressing or briquetting step, this pressed or briquetted product is comminuted, the comminuted product is separated into two or more fractions, the fraction in which at least 85% of the particles are bigger than 80 $\mu$m, and preferably bigger than 100 $\mu$m, or are between 80 and 2000 $\mu$m, and preferably between 100 and 1000 $\mu$m, are withdrawn as a product and are rounded in an additional step if any, while the other fraction or fractions exit the process or are recirculated into the process.

EP 0 191 278 disclosed a colour preparation for the colouring of building material using inorganic metal oxides, and consisting of a pourable damp granulated material. The latter document also provides for a powder which is to be scattered on the granulate as a separating agent to keep the granulate pourable even in large containers, so that the granulate only needs to be dried in part.

The drawback of this is the fact that a homogenous distribution of the separating agent is not guaranteed in this mixture of damp granulated material and separating agent, and that flowability is restricted due to the granulated material's shape.

Furthermore, DE 39 18 694 C1 and DE 41 03 531 A1 disclosed processes to produce spray granulates using previously mixed in inorganic binders. According to DE 41 03 531 A1, it is possible in this context to bond fine particles to the cores using an additional build-up granulation. A drawback of both processes is the high consumption of drying energy In the process described in DE 39 18 694 C1, a pigment suspension is sprayed in drop shape, and dried to obtain pigment micro granulates in a flow of hot gas. The suspension is pulverized using a centrifugal atomizer, a pressure nozzle, or a two-component nozzle. The stability of the granulated materials is achieved by inorganic binders blended into the aqueous pigment oxide suspension beforehand. The drawback of this is the high dust content, and the bad flow behaviour.

Another disadvantage is the fact that pigment oxides of the granulated materials are mixed with inorganic binders which should guarantee stability during transportation and storage.

Although the process proposed in DE 41 035 31 A1 also provides for spraying with aqueous solutions of inorganic binders during a subsequent granulation, this rather corresponds to a bonding of fine particles to the granulate core, and thus to a granulation of the dust particles in the mix. This can also form an external shell of particles and binders exposed to abrasion on the granulate core.

According to a process described in DE 197 31 698 A1, pressed granulates are produced essentially by applying line forces of >15 kN/cm, and they are comminuted in general, and rounded if necessary. As in DE 196 38 042 A1, the pigment powder is mixed with binders too. Surface-active and/or blasting agents are also introduced into the mix to dissolve adherence at a later time. It cannot be excluded in this context that such substances have adverse effects on the properties of the coloured building materials.

It is the object of the invention to provide a granulate and a process for the economic production of this granulate, which is able to liberate itself at a high speed after its addition to a building material to be coloured.

The invention presents a series of advantages.

The granulated materials consist of a core without binder and of a shell. The shell adapts to the surface of the granulated material, enclosing it completely, and generating mechanical strength. No binders, emulsifying agents, surface-active agents, dispersing agents, and preservatives are mixed into the pigment oxide powder, while a pigment-water mixture is produced and granulated. In contrast to the auxiliaries used according to Background Art, the use of water presents the advantage that it can be expelled again during the process. The physical properties of the granulated materials, such as transport and storage stability, are brought about by the shell characteristics, so that they are reproducible and stable. An advantage for the manufacture of the granulated materials is the opportunity to separate useful and recycling grain sizes.

It is also possible to use the process according to the invention to produce binder-free granulated materials, and to coat them with a melting by spray deposition. The coating material must have a fusion temperature of >60° C., and it may consist, e.g., of wax. It is an advantage in this context to obtain the hardening of the shell by cooling it down using an air flow at a regulable temperature.

At the time of transportation, the granulate according to the invention will have a solid shell with an approximately uniform nature and thickness. By classifying the grain size, and creating a coating by drying the granulate if necessary, it is possible to adjust compaction weight, remaining humidity, shell thickness and grain size, thus adapting these values to the conditions desired in the corresponding case. The granulate according to the invention is characterized by a high compatibility with building materials.

By arranging a shell around the granulated material cores, the colouring pigment will be present without any fixed bond in the building material after adding the granulate and destroying the shell, so that the disagglomeration of the granulated materials will proceed at a very high speed because, as no binders were used in the granulate material core, the granulated materials will only present a very low adhesive force there. The high dissolving power of the coated granulated materials allows the use of granulated materials with higher grain diameters. Other advantages include the low content of foreign matter in the colouring pigments of the coated granulated materials, and the universal applicability of the process according to the invention to produce the coating for all granulation processes disclosed so far such as, e.g., press granulation, fluid-bed granulation, spray granulation, or build-up granulation.

BRIEF DESCRIPTION OF DRAWINGS

The invention will now be explained in detail with reference to an embodiment.

In the corresponding drawing:

As shown in FIG. 1, powdered colouring pigments are withdrawn from a colouring pigment hopper 1 using a dosing device, and fed to a compulsory mixer 2. In this compulsory mixer 2, water is added at a proportion of between 10% and 30% to form granulated materials. The discharge of the mixer 2 is fed to a primary granulator 3 which produces a primary granulate in the desired grain size. This primary granulate is fed to a pelletizer disk 4 and compacted. A modifiable disk setting ensures that a useful grain size of 0.5 mm to 1.5 mm is produced-predominantly. dominantly. The discharge of disk 4 is fed to a shaking screen 5 on which oversize particles with a grain size of more than 1.5 mm are separated. The useful grain size fraction of 0.5 to 1.5 mm separated by the shaking screen 5 is fed to a continuously working drum 6 in which spray nozzles 6.1 are used to add polyvinyl alcohol in an aqueous suspension, forming a coating material which is liquid at first. In drum 6, continuous dry air 6.3 is fed in the area of a drying zone 6.2, thus reducing the water content of the sprayed granulated materials to a value of less than 0.5%, and obtaining the solidification of the coating material. By the dry air 6.3, fine size portions of the colouring pigment material in drum 6 are picked up, separated in a dust removal plant 8, and fed to the mixer 2. The discharge of drum 6 is fed to and stored in the finished material bin 7 as coated coloured granulates.

LIST OF REFERENCE SIGNS

Figure 1:
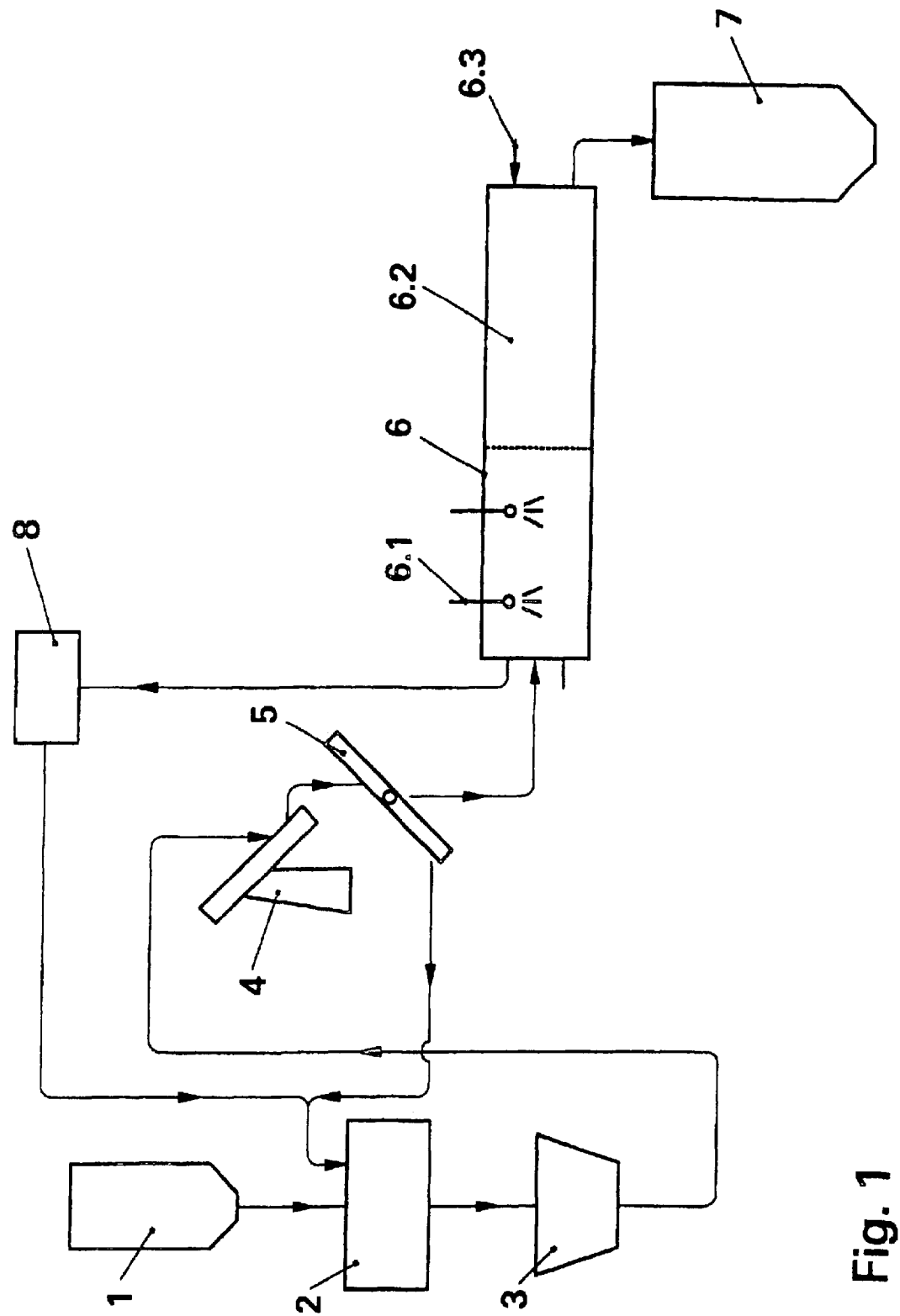
FIG. 1 is a diagrammatic view of the process used to produce coated granulated materials.

1 Colouring pigment hopper
2 Mixer
3 Primary granulator
4 Pelletizer disk
5 Shaking screen
6 Drum
   6.1 Spray nozzles
   6.2 Drying zone
   6.3 Dry air
7 Finished material bin
8 Dust removal

What is claimed is:

1. Colouring pigment granulated materials for the colouring of building material, especially for the colouring of concrete, characterized in that the granulated materials consist of binder-free granulate material cores of grain size 0.1 through 8 mm which are surrounded by a coating layer made of a destructible material, and in that the granulated material presents a moisture content of <30%.

2. Colouring pigment granulated materials for the colouring of concrete as claimed in claim 1, characterized in that the coating layer consists of organic matter, or of a mixture of inorganic and organic matter.

3. Colouring pigment granulated materials as claimed in claim 1, characterized in that the granulated materials present a grain size of 0.5 through 1.5 mm and a moisture content of <5%.

\* \* \* \* \*